United States Patent [19]

Simelunas et al.

[11] Patent Number: 4,807,741
[45] Date of Patent: Feb. 28, 1989

[54] AUTOMATIC DIRECT SOFT COOKIE LOADING APPARATUS

[75] Inventors: William J. Simelunas, Glen Rock; Henry N. Shoiket, Rutherford; Celso Espejo, Chatham, all of N.J.

[73] Assignee: Nabisco Brands, Inc., Parsippany, N.J.

[21] Appl. No.: 913,226

[22] Filed: Sep. 30, 1986

Related U.S. Application Data

[62] Division of Ser. No. 682,244, Dec. 17, 1984, Pat. No. 4,662,152.

[51] Int. Cl.[4] .............................................. B65G 29/00
[52] U.S. Cl. ................................. 198/477.1; 198/802; 198/859; 414/47; 414/88; 53/253
[58] Field of Search ............... 414/43, 47, 48, 49, 414/88, 97; 198/475.1, 476.1, 477.1, 802, 803.14, 859; 53/253

[56] References Cited

U.S. PATENT DOCUMENTS

| | | | |
|---|---|---|---|
| 861,273 | 7/1907 | Eichler | 53/253 |
| 2,707,548 | 5/1955 | Furst | 198/477.1 |
| 3,340,672 | 9/1967 | Kayser | 53/153 |
| 3,505,782 | 4/1970 | Niederer | 198/803.14 |
| 3,556,280 | 1/1971 | Schnee et al. | 198/812 X |
| 3,748,797 | 7/1973 | Deines | 53/152 X |
| 3,768,231 | 10/1973 | Koslow | 53/244 X |
| 3,786,617 | 1/1974 | Fluck | 53/154 |
| 3,812,647 | 5/1974 | Bertling et al. | |
| 3,990,209 | 11/1976 | Eisenberg | |
| 4,044,885 | 8/1977 | Rose et al. | |
| 4,159,761 | 7/1979 | Egee et al. | |
| 4,166,525 | 9/1979 | Bruno | |
| 4,236,855 | 12/1980 | Wagner et al. | |
| 4,281,757 | 8/1981 | Morton | 198/812 X |
| 4,380,939 | 4/1983 | Gardner | 198/859 |
| 4,413,462 | 11/1983 | Rose | |
| 4,499,988 | 2/1985 | Gasser | |
| 4,564,329 | 1/1986 | Bantien | 198/347 |
| 4,662,152 | 5/1987 | Simelunas et al. | 53/246 |

FOREIGN PATENT DOCUMENTS 2601833 7/1977 Fed. Rep. of Germany .

Primary Examiner—Robert J. Spar
Assistant Examiner—Cheryl L. Gastineau
Attorney, Agent, or Firm—Richard Kornutik

[57] ABSTRACT

An apparatus for handling articles has a rotatable table. A pivotable tray support is attached to the rotatable table. The tray support has a slab-like member for entering rear portions of trays to provide resilient support for the trays. The resilient supporting of the trays avoids damage to articles being loaded in the trays. The tray support has a lower surface for supporting the trays. The trays are unloaded by pivoting the tray support.

18 Claims, 3 Drawing Sheets

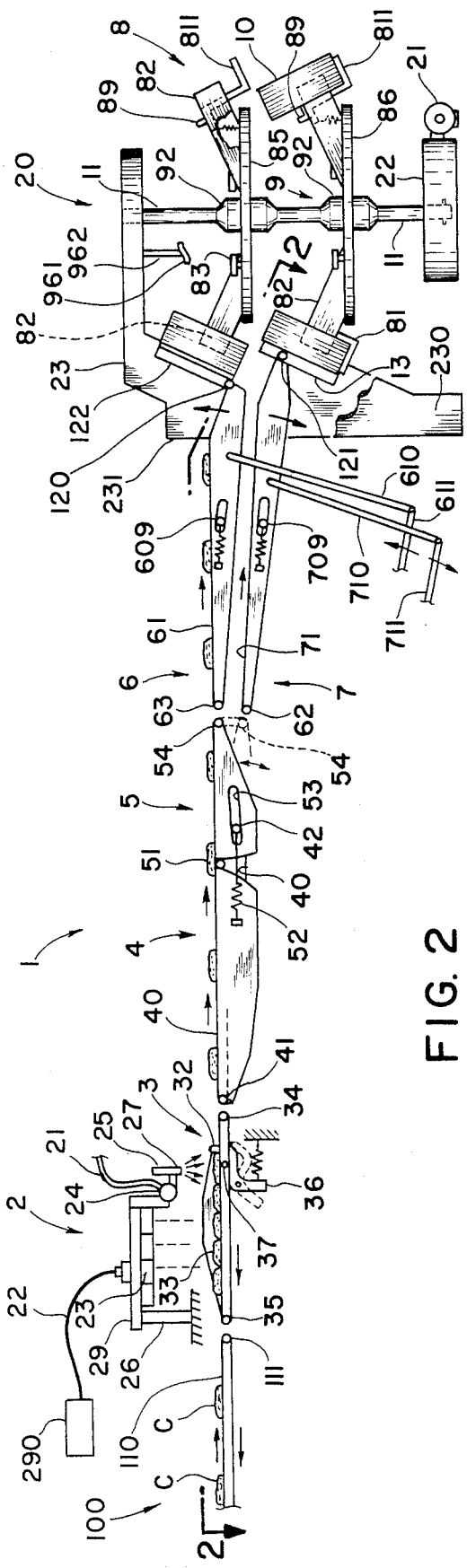

AUTOMATIC DIRECT SOFT COOKIE LOADING APPARATUS

This is a division of application Ser. No. 682,244 filed on Dec. 17, 1984, now U.S. Pat. No. 4,662,152.

BACKGROUND OF THE INVENTION

This invention relates to an apparatus for accumulating, distributing, and directly loading cookies into trays, which trays can be used as packages for the cookies.

This invention may also be adapted for use as an automatic direct loading device for any generally disc-like objects or articles such as tuna cans, poker chips, hockey pucks, sandwich cookies, soft cookies having multiple textures, pet biscuits, and the like.

It is well-known to use conveyor belts for conveying biscuits from an oven. It is also conventional to transport biscuits, including cookies, from one conveyor belt to another. It is also known to package cookies in cartons so that the cookies are arranged in stacks filling partitions in the cartons. There are several prior art patents relating to automatic loading apparatus, which are discussed hereunder.

The Egee et al reference, U.S. Pat. No. 4,159,761, is the most relevant known reference, and in FIG. 5 shows cookies being deposited directly from a conveyor belt into a stack. The stack is supported on a blade-like gate 52 which is rotatably supported and revolved upon a signal by a gate actuating means 54, to drop a stack of cookies 36 into a pocket of a tray 56. Such a tray 56 is also shown in FIG. 6 of the drawings in side sectional view. While this apparatus is significantly different from the apparatus of the present invention, there is a similarity in the result, namely that cookies are ultimately stacked into trays automatically. However, the apparatus of the Egee patent would not be suitable for relatively soft cookies, which are very susceptible to breaking, nor for relatively high speed operation. Furthermore, the manner in which the cookies are stacked in Egee results in trays being filled so that they are not stacked on their edges in a tray, but rather lie on their bottom surfaces in the tray. The cookies are, in other words, resultingly stacked parallel to the bottom of a tray rather than perpendicularly to the bottom of a tray as in the present invention. Furthermore, there is no showing of a flexible support, nor of moving of the conveyor belt exit end upward or downward to accommodate the stacking of the cookies. FIG. 1 of the Egee patent shows cookies lying on edge being transferred to a conveyor belt where there may lie on their bottom surfaces for feeding to the apparatus shown in FIG. 5. Therefore, while the Egee patent addresses a similar problem in the art, that of stacking cookies, there is no teaching or suggestion of a movable conveyor belt where an end of the conveyor belt moves up or down, or toward or away from a tray, to selectively distribute cookies vertically, the cookies being received against a relatively resilient tray wall. Furthermore, there is no teaching or suggestion of providing that each cookie directly impacts a resilient wall of a tray during the loading operation.

The Rose et al U.S. Pat. No. 4,044,885 relates to a method and apparatus for counting and loading cookies. Here, a relatively complex apparatus eventually places cookies into a stack as shown in FIG. 11. Also, cookies are shown in FIGS. 13-15 as falling along a chute where they collide with drop rails 56 and 58. This feature alone renders it unsuitable with use for relatively soft cookies since it would damage them. Furthermore, there is no teaching or suggestion of use of a movable conveyor belt, which conveyor belt is relatively movable to a tray having at least a flexible wall portion for receiving cookies which collide with such wall, the conveyor belt being movable relative to the tray being loaded, the tray being supported such that no hard or rigid surface directly underlies those portions of the tray which collide with the cookies.

The Rose patent, U.S. Pat. No. 4,413,462, shows an accumulator and stacker for sandwich biscuits and the like. Here, a relatively complex apparatus stacks sandwich cookies one atop the other. This is shown most clearly in FIGS. 3 and 7-11. While the net result is cookies being stacked two-by-two, there is no teaching or suggestion of employing a flexible tray which directly collides with cookies received from a conveyor belt, the conveyor belt and tray moving relatively to one another so that cookies are stacked without colliding directly with one another. This patent appears to have a different result than the present invention in that stacked cookies are wrapped in a flexible wrapper, rather than being received in a flexible tray. Also, conveyor belts movably positionable, pivotable, or extendable are not shown or suggested in this patent.

The Wagner et al patent, U.S. Pat. No. 4,236,855, shows an accumulator in FIGS. 1 and 2 for selectively accumulating and releasing cookies. Also, in FIG. 1, stacks V are shown; however, it appears from FIG. 3 that each layer of the stack rests upon shelves S. An elevator carriage mechanism is used, together with the relatively complex control system schematically shown in FIG. 19. This patent is far from the teachings of the present invention, wherein trays are directly loaded by a moving conveyor, which moves relatively to the flexile tray which receives cookies in stacked alignment. Furthermore, although an accumulator is shown, it does not operate in a manner similar to the accumulator means of the present invention. Also, movably positionable, extendable, or pivotable conveyor belts are not shown or suggested in this patent.

The Eisenberg patent is notable for FIGS. 5A and 5B where articles are stacked in relatively short stacks. FIG. 5C shows a chute 36 which permits a sliding article to slide directly over another article; however, there is no teaching of the article sliding along the chute 36 and colliding with a flexible wall, nor is there any teaching that the chute 36 moves upward relatively to such stack as in the present invention. The Bertling et al patent, U.S. Pat. No. 3,990,209, shows a relatively complex stacking system which is very different from the present invention, and does not show a flexible tray with which moving cookies collide, nor does it show a conveyor means which moves relatively to the previously stacked cookies and the flexible tray.

SUMMARY OF THE INVENTION

It is accordingly one object of the present invention to provide an improved cookie or biscuit stacking apparatus which is automatic and stacks soft cookies directly into trays.

Another object of the present invention is to provide improved loading device for directly automatically loading trays, including transporting relatively squat objects into the trays.

A further object of the present invention is to provide an improved loading apparatus including an accumulator for accumulating a predetermined number of articles to be loading into trays.

A still further object of the present invention is to provide an improved automatic loading apparatus including a support for flexible trays, the support being so disposed that rear walls of article-receiving portions of the trays are not directly supported so that they may resiliently collide with a moving article, thereby avoiding damage to the article.

Another still further object of the present invention is to provide a rotatable support for trays, the trays being fixed to the rotatable support, and having an automatically actuated tilting means for tilting loaded cookie trays forward so that they slide off the support and down a chute.

Another object of the present invention is to provide an improved automatic direct article loading apparatus including an accumulator section having an optical sensing means for controlling a release member, an air jet for maintaining articles downward against a relatively moving conveyor belt so that hopping of the articles over a movable barrier member is avoided; a first conveyor having a pivotable section selectively directing released articles to either a first conveyor belt or a second conveyor belt;

each of said first and second conveyor belts being movable upwardly and downwardly about a fixed end, the fixed end being where articles are received and the pivotable end being the end which unloads articles directly into a tray; each of said first and second conveyor belts also being extensible or retractable towards or away from a tilted article-receiving tray which is mounted upon a tiltable support; each of the supports being rotatably mounted upon a carousel; the carousel having a friction drive and an automatic indexing system.

The present invention includes a conveyor belt feeding hot, soft cookies in rows to an accumulator station. electric eye sensors detect the presence of more than two cookies in a column to permit release of cookies by cam-actuated "fingers" to release cookies at predetermined intervals. In the accumulator section, relatively higher-speed belts, spaced apart, run under the cookies so that upon release of the "fingers" a single cookie in each column is released. The released cookies travel to an intermediate conveyor which has a bendable or pivotable portion so that cookies are transferred selectively either to an upper conveyor belt or a lower conveyor blet. Ten cookies are deposited at a time on the selected upper or lower belt. The cookies on the upper and lower blets feed directly into plastic trays, the ends of each of the upper and lower belts nearest the respective trays being movable upwardly and are extensible to maintain even spacing from the tilted, flexible tray surface. The upward movement of the belts ensures that cookies do not directly collide, so that each next stacked cookie arrives so as to collide with flexible rear tray wall first to avoid damage to, or bending cookies. A carousel having upper and lower tray support regions holds six trays in spaced relationship on each tray. Each tray is supported only along its bottom surface and by two blades received between row surfaces, to receive a total of three cookie stacks. When a tray is filled a portion of the carousel holding the tray rotates to bring an empty tray into position. The filled tray slides down a chute.

Further details and advantages of the present invention appear from the following description of the preferred embodiment shown schematically in the drawings.

BRIEF DESCRIPTION OF THE DRAWINGS

FIG. 1 is a side elevational view of the apparatus according to the present invention;

FIG. 2 is a top elevational view of the conveyor belt arrangement and accumulator, together with a partial sectional view through the tray support device and the tray itself showing stacks of soft cookies which are being loaded;

DETAILED DESCRIPTION OF THE INVENTION

Figure 3:
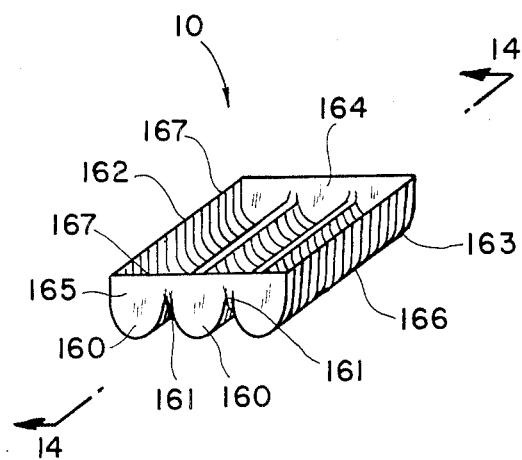
FIG. 3 is a perspective view of a preferred embodiment of tray used in the loading apparatus of the present invention.

FIG. 1 shows a side elevational view of the entire automatic loading apparatus 1 of the present invention. An accumulator 2 accumulates cookies until a predetermined number are arranged in columns, and includes an optical controller for a release device 3.

Cookies are released onto a fixed portion 4 of a pivotable conveyor belt having a pivotable section 5 which selectively feed directly onto either an upper movable conveyor belt 6 or a lower movable conveyor belt 7. Cookies are loaded directly from either the upper conveyor belt 6 or the lower conveyor belt 7 into trays 10. The trays 10 are supported by a tray support device 8, which is rotatably carried by a rotatable support member carousel 20. The carousel 20 is frictionally driven by a transmission portion 9.

Soft cookies arrive from a conveyor section 100. The conveyor 100 conveys cookies C directly from an oven in a soft and delicate condition. A conveyor 110 transports the cookies to narrower conveyor belts 31, which are spaced apart to permit crumbs and other articles which are loose to fall between the belts 31. The belts 31 travel at a relatively high speed compared to the other devices, and arrange cookies in rows 101 beneath an optical sensor station 29 having an optical sensor member 23. The optical sensor detects the presence or absence of a sufficient number of cookies in the column 101 along the line 22 to a controller 290. The controller 290 either permits or prevents actuation of a cam member 37 which controls downward movement of retaining member 32, which are connected in pairs.

While the retaining fingers 32 are in upper or raised position they prevent passage of cookies beyond a fixed location to form columns 101. The conveyors belts 31 continue to move beneath the cookies C in the column 101, and when a sufficient number of cookies C have been accumulated in the column 101, they are released individually in intervals controlled by the cam member 37 which rotates at a generally constant speed in timed relationship to the speed of the other conveyor belts in the system. A separator member 33 is seen in FIG. 1 and a plurality of such separator members 33 separates and guides cookies into the columns 101 atop the conveyor belts 31. An air supply hose 21 supplies air to a plenum which is supported by the optical control device support 29 so as to direct air from the plenum 24 into nozzles 25 having open ends 27. The directed air from the nozzle openings 27 directs air downwardly to retain the foremost Cookie in each column downwardly against the conveyor belts 31 to prevent hopping of the cookies C over the fingers 32. The downwardly directed air also prevents bouncing of the cookies when the finger member 32 are suddenly withdrawn downwardly, thereby ensuring proper spacing of the cookies into uniform rows across subsequent conveyor belts downstream of the conveyor belts 31.

The optical support means 29 is supported, for example, by columns 26 which are connected to any fixed surface such as a floor or wall. The conveyor belt 110 supplying cookies C from a oven (the oven is not shown in FIG. 1) has an end conveyor belt roller 111. The conveyor belt roller 111, and the conveyor belt roller 35 and 37 for the conveyor belts 31 are of sufficiently small diameter to permit a smooth transition of the cookies C from the conveyor belt 110 to the conveyor belts 31. Thus, there is only a very small gap between the rollers 111 and 35, and due to the small diameters of the rollers 111 and 35 there is only a very small downward bending possible of the cookies during their transition from the conveyor belt 110 to the conveyor belts 31. The same is true of the transition from the roller 34 supporting the conveyor belts 31 to the roller 41 which supports a conveyor belt 40.

The accumulator section 3 provides cookies C at timed interval to the conveyor belt 40 of the fixed portion 4 of the pivotable conveyor belt. The pivotable conveyor belt 4 has a pivoting section 5 which is pivotable between two positions as indicated by the dotted outline of the roller 54 in a position originally supplying a conveyor belt 6 to a position for supplying a conveyor belt 7. The pivoting action takes place in a very rapid manner so that no cookies C are disturbed during their transition from above the roller 54 to one of the conveyor belts 6 or 7. The pivotable section 5 pivots about a main pivot joint 51 of any standard construction, including but not limited to a bearing joint, ball bearings, a gear arrangement or the like. Beneath the pivot member 51 is seen spring 52 which resiliently tensions a roller 42 which is constrained to move linearly along a slot 53. One end of the spring member 52 is fixably connected to the fixed portion 4.

The fixed portion 4 may be fixably supported to any surface which is immovable, such as floor or a wall, for example by strut members, posts, columns, brackets, or the like so that the fixed portion 4 is supported in a predetermined and fixed relationship to the conveyor belts 110 and 31. A resilient member is connected to a fixed support and to an end 36 of the accumulator retaining portion 3, the end 36 being fixedly connected to the fingers 32 and pivotable about a pivot member during actuation downward or upward due to the presence of the cam member 37. The fixed support members referred to hereinabove are not shown because such are obvious expedience known to anyone having skill in the conveying art, and such supports do not constitute or form a part of the present invention per se. Such supports are necessary for supporting the fixed portions of the apparatus of the present invention.

The pivotable portion 5 of the conveyor 4 has an end roller 54 which is pivotable downwardly to a position shown in dotted outline to selectively feed either conveyor belts 6 or 7. The roller 54 is in its solid outline position adjacent roller 63 of conveyor belt 61. In the dotted outline position, the roller 54 is adjacent a roller 62 which supports a conveyor belt 71 of the conveyor belt 7. Arrows generally indicate direction of each of the conveyor belts 110, 31, 40, 61, and 71. This serves to define the upstream and downstream portions of the apparatus, as well as the direction of movement of cookies C. Furthermore, the solid, two-headed arrow directly beneath the pivotable section 5 indicates that the pivotable section moves upwardly or downwardly selectively.

Figure 7:
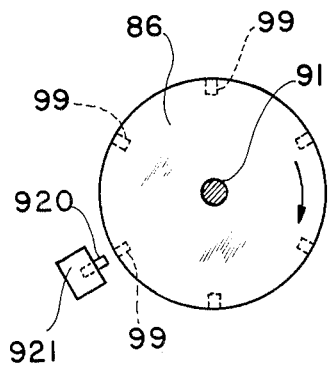
FIG. 7 is a top elevational view, partially in section, showing an indexing means as well as the rotary frictional drive member.
Figure 8:
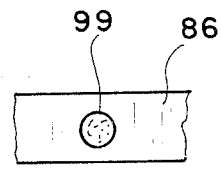
FIG. 8 is a side elevational view of an indexing or formed through the rotary support member of FIG. 7.

The movable conveyors 6 or 7 are virtually identical members which are so positioned as to have a very small gap existing between the rollers 54 and 63 in the upper position of the pivotable section 5, and between the rollers 54 and 62 in the lower position of the pivotable section 5. A roller arrangement necessary to permit the conveyor belt 40 to be maintained in a specified tension range is not shown in FIG. 1, but is shown in FIGS. 7 and 8. The slack take-up roller 42 is necessary since the overall belt length of necessity changes during the pivoting motion of the pivotable section 5. The spring member 52 is connected to a fixed member such as a bearing outer sleeve, or the like, so that the fixed portion is preferably constrained linearly along the slot 53 without undue frictional resistance acting upon the roller 42. The bearing is unnumbered in the Figures, but may be any type of anti-friction means such as a packed bearing, bearings having anti-friction surfaces or very low-friction surfaces including Teflon ® or the like. The same is true of any of the moving or pivoting joints of the present invention, since such bearing devices, anti-friction surfaces and pivoting joints are well-known in the mechanical linkage art and mechanical bearing arts to anyone of skill in those arts.

The conveyor belt 6 is movable in such a manner that the roller 63 maintains a fixed position, while the far end roller 120 moves upwardly and downwardly, the entire conveyor belt 6 pivoting about and through an arc having its center at the rollers 63. As shown in FIG. 1, the arc begins at its lowermost point with the roller 120 being at the lowest position possible and being located in a slot 12. The slot 12 controls the position of the roller 120 as the conveyor 6 moves upwardly or downwardly. In FIG. 1, the conveyor 6 as shown is just beginning its upward movement as indicated by the large arrow near the roller 120. A take-up roller 609 is provided to permit movement of the roller 120 which maintains a constant and fixed distance between the roller 120 and the nearest section of the rear-most wall of each of the trays 10 which are supported in an inclined position as shown in FIG. 1. The fixed end portio 63 may be fixed in any known fashion, such as being supported by struts, posts, brackets, or any other device connected to any fixed surface such as a floor or wall, the ceiling or the like, so long as the support permits pivoting of the conveyor 6 about the roller 63.

As seen in FIG. 1, as the conveyor 6 begins upward movement of its downstream end, the conveyor belt 61 is level with the conveyor belt 40. However, this is a design expedient, and the entire carousel and support structure could be located lower so that when the downstream-most end of the conveyor 6 is at its uppermost reach in the upper slot 12, for loading the top-most cookie in a stack in the tray 10, the conveyor belt surface 61 would be level (this embodiment is not shown in the Figures, since such would be merely a matter of choice to anyone skilled in the conveyor art). The movable conveyor 6 is caused to move by struts 610 and 611 which are pivotably connected together. The strut 610 is also pivotably connected to a housing portion (unnumbered) of the conveyor 6. The strut 611 can be moved by a cam member, by a direct gear drive, or by any other type of motive means which cause cyclical upward and downward motion of the strut 611 so as to direct the strut 610 upwardly and downwardly through a fixed range of motion. As seen in FIG. 1, the strut 611 in the position shown is moving upwardly.

In FIG. 1, the movable conveyor belt 7 is pivoted substantially identically to the manner of pivoting of the conveyor 6. The roller 62 is maintained at a fixed location, with end roller 121 being pivotable upwardly and downwardly through an arc about the fixed roller 62. As in the above, any type of support can be used to permit rotation of the roller 62 while at the same time fixedly locating it with respect to any fixed support surface such as a wall, floor, or celing. Motion of the conveyor 7 is controlled by a strut 710 which is pivotably connected to strut 711. The strut 710 is pivotably connected to a housing portion (unnumbered) of the conveyor 7, so as to permit movement of the conveyor 7. In FIG. 1, the motion of the strut 711 is downwardly, as indicated by the arrow through the strut 711, thus causing downward motion of the downstream portion of the conveyor 7 as indicated by the arrow drawn near the downstream end. The roller 121 is constrained to move in a slot 13, which slot 13 is parallel to the orientation of the nearest edge of a tray 10.

The directions of motion of the conveyors 6 and 7 are opposite to one another in FIG. 1, and the pivoting of the pivotable conveyor portion 5 permits simultaneous loading of at least two trays 10 at the same time. This is necessary, since the oven capacity for producing cookies C is greater than the capacity of either conveyors 6 or 7 alone to load cookies C directly into the trays 10 without damage to the cookies C.

The cookies C are relatively soft and delicate. If improperly handled, or if the cookies collide with one another or collide with a hard surface they would bend and cool in a deformed state, or would tend to crumble or break. To avoid this, the conveyor ends of the conveyors 6 and 7 are sloped downwardly so as to load the cookies parallel to a bottom support surface of the trays 10. The upward motion of the conveyor 6, for example, loads cookies one at a time into the tray 10. The upward movement of the downstream end of the conveyor 6 is timed so that as each cookie enters the tray 10 it is at a location just sufficiently above the previously-loaded cookie to prevent collision directly with the previously-loaded cookie. Instead, any collision forces are absorbed by the resiliently deformable trays 10, which are composed of a very then resilient material such as plastic or the like.

The conveyor 7 has no cookies C shown thereon since the tray 10 which the conveyor 7 feeds is full and no further cookies can be loaded until a new tray 10 is in position. Therefore, the pivotable section 5 is feeding the conveyor 6 rather than conveyor 7 while the conveyor 7 makes its arcuate downward motion under the influence of gravity and strut 711 to bring the conveyor 7 to the lowermost loading position. The slot 13 guides the length of the roller 121, similarly to that of roller 120 of the conveyor 6, with a movable roller 709 taking up slack to maintain tension in the belt 71 within a predetermined range. This is necessary because of the change in length of the belt due to the extension of the roller 121 caused by its movement within the slot 13. The slots 12 and 13 are formed in a support member 231, with corresponding opposed slots being formed in an opposing support member 230 which is shown as being partially broken away in FIG. 1. Thus, only the lowermost portion of the support member 230 is shown in FIG. 1. The support members 230 and 231 are supported upon a fixed surface such as a floor.

The support member 231 supports an upper carousel support portion 23 which, in a preferred embodiment, includes a solid surface extending between support member 230 and 231, a portion of which is transparent to permit viewing from above of the loading operation of the conveyors 6 and 7 into trays 10. The remainder of the portion 23 is preferably of a solid material such as metal or the like and receives an uppermost portion of spindle 11 in a rotable relationship thereto. This forms the uppermost portion of the carousel 20.

The carousel 20 supports trays 10 at a predetermined inclination, and permits automatic movement and indexing of trays 10 into their proper position relative to the conveyors 6 and 7 for loading the trays 10. Empty trays 10 are placed on holders 8, while full trays are unloaded automatically by the holders 8 in cooperation with a fixed member 961, supported by strut 962 to the upper portion 23 to cause tilting of a portion of the support 8 to cause the loaded cookie trays to slide down a chute (not shown). Although in FIG. 1 only a single fixed member 961 is shown attached by a support 962, another fixed support member substantially identical to support strut 962, as well as a fixed portion similar to that of fixed member 961 would be fixed in a similar relationship just above the lower portion of the carousel to permit unloading of the lower trays 10. Such strut 962 would preferably be supported by connecting it to a fixed portion which extends above the lower carousel portion without interfering with the rotation thereof. Such is not shown in the Figures, since such would be an obvious expedient in view of the location of the strut 962 and fixed portion 961 shown in the FIG. 1, the positioning of another such like member being selectable in any manner preferred or selected by anyone skilled in the construction or metal working arts.

The rotation of the carousel 20 is caused by a motor 21 which transmits motive power through any known type of transmission along a base 22 of the carousel, to provide rotary motive power to a spindle 11. The transmission can be a frictional drive transmission or can be a chain and sprocket type transmission for a positive power transmission. An indexing means locks each of the upper and lower carousel support surfaces 85 and 86 respectively, to intermittently permit rotation of the disc-like members 85 and 86 to move loaded trays 10 to an unloading ramp and to move the empty trays 10 to a position in which they can be precisely loaded. The indexing means is not shown in FIG. 1, but a preferred type of indexing means in shown in FIGS. 7-9.

While a particular arrangement of carousel parts is shown in FIG. 1, the carousel 20 may be configured in any fashion to give the desired results, namely the provision of at least an empty tray 10 to a loading position, and movement of such a tray 10 to an unloading position; all the while permitting positioning of empty trays 10 upon the supports 8.

As one example of a different type of tray conveying system, a linear support system pulled by chains could be provided perpendicularly to the plane of FIG. 1 so that trays 10 would move downwardly into the page and empty trays would be provided from above the page. Such a conveyor system could include any desired loading and unloading means. However, the carousel 20 of the present invention is a particular preferred embodiment, other embodiments being available if such are desired. Such embodiments would include any known conveying devices for supplying empty trays or containers to a loading station where the containers stop to be loaded and to an unloading station where the loaded trays or containers are unloaded; such a system would preferably also include a return path for the conveying means such as a drag chain pulling tray support members 8 in a linear path, for example, from the loading station to the unloading station, and on the return path permitting stopping for placing of empty trays or containers upon the tray support means 8. Preferably, such a support means would have a completed cycle so that a continuous operation for loading of cookies C could be provided. A particular feature of the tray support means 8 permits support of the trays so that the portions of the tray which collide with the moving cookies C are not directly reinforced by any solid member but rather are only supported between the cookie-receiving portions of the trays 10 by the projecting slab-like members 82. The slab-like members 82 enter a portion of the rear of the trays 10 to a predetermined depth where they encounter a solid portion of the rear of the trays 10. A lowermost portion 811 of the tray support means 8 prevents downward movement of the trays 10. An unloading member 89 is provided to interact with the member 961 to cause pivoting of the lower support portion 811 during an unloading operation. A spring member maintains the position of the lower support portion 811 against the weight of the trays 10, as is shown by the broken-away portion in FIG. 1 of the support means 8. Such spring is shown in dotted outline in the support means 8 shown directly below the broken-away means 8 in FIG. 1. A bolt 83 anchors the slab-like members 82, which heavily support the support portion 811, to the tables 85 and 86 respectively. The unloading member 89 is fixably attached to a portion of the unloading means which is fixed to the support portion 811, and which, upon movement of the support member 89, causes a rotational movement of the entire pivotable portion about a pivot member supported by the slab-like members 82. This is shown more clearly in FIGS. 22-24.

The carousel has a transmission portion 9 formed by an outer member 92 which is in a preferred embodiment rotatable with the members 85 and 86, as well as with the spindle 11. An inner shaft contained rotatably within the spindle 11 preferably frictionally drives separately each of the supports 85 and 86, so that if an obstacle is encountered such as a human hand, a loading cart, or the like, operation of the carousel tray involved is stopped to prevent damage to any of the equipment. A lock-out switch preferably would then be tripped to prevent improper operation of the conveyors and the accumulator 3, which would all automatically return to a certain "reset" position before completely stopping.

The apparatus of FIG. 1 is especially well adapted and suited for use with delicate, soft, bendable articles such as cookies C which must be precisely handled without collision or encountering of hard objects during most of the length of their travel, with the exception of the fingers 32 which encounter subsequent cookies in the rows 101 when the cookies have moved forward only a very short distance and have therefore acquired only a very low momentum. Furthermore, the fingers 32 stop each cookie at two points and avoid damage to the cookie by distributing any load where force is required in stopping the cookies. Nonetheless, hard or difficult-to-damage items such as poker chips, tuna cans, hockey pucks, and the like could also be loaded into cartons or trays using the apparatus of the present invention, since such apparatus precisely locates each of the articles directly into a generally resiliently supported and resilient tray 10 in a precise order, while accumulating the articles at an accumulator station 3 from a supply 100, which supply need not be as precisely organized in rows and columns as are the cookies C which are released by the accumulator. Therefore, the function of the accumulator is to provide precisely arranged rows and columns of articles to be loaded into the trays 10. Furthermore, relatively thin objects such as playing cards, menus, or the like can also be loaded into cartons in the inventive apparatus shown in FIG. 1. Here, it is especially evident that the air jet directed downwardly against the articles at the accumulator station by the opening 27 is very helpful an maintaining precise control of the articles on the conveyor belt. Also, while an optical sensor means has been shown as being located at an accumulator station 3, any control or sensing devices can be used and any number of articles or cookies C can be manipulated as may be desired. For example, if poker chips were to loaded into rows one hundred across and one thousand long, such arrangement could easily be made by anyone with skill in the control arts having knowledge of the control arrangement of the present invention as shown in FIG. 1 and following Figures.

FIG. 2 is a top elevational view of the apparatus of FIG. 1, as taken along line 2—2 of FIG. 1. The upper surface of the rotary tray support table 85 is visible in FIG. 2. Also, the cross-sectional circular outline of the spindle 11 is seen in FIG. 2. Cookie stacks are seen in the tray 10 (unnumbered in FIG. 2). FIG. 2 also shows the manner in which trays 10 are supported, that is, with the two slab-like members 82 projecting in between cookie columns where the back of the package is recessed between the columns.

The cross-sectional shapes of support members 230 and 231 are also visible in FIG. 2, as are slots 13, which guide the motion of the roller, the ends of which are guided either directly by the slot or by a bearing member which travels within the slot and which bearing rotatably supports the roller 120.

As seen in FIG. 2, the cookies arrive from an oven along a conveyor belt 110 in slightly misaligned rows and columns. They are separated into three columns (only one of which, column 101, is shown in FIG. 2) at the accumulator station 3. Generally speaking, conveyor belt 110 travels approximately the same rate of speed as the conveyor belt 40, 61, and 71. The belt speeds may be selected to be different from one another if such is expedient for any reason. However, the belts 31 at the accumulator station 3 travel somewhat faster that the other conveyor belts although such is not necessary for the proper working of the present invention such is desirable since otherwise there would be a possibility that the accumulator station would become a "bottleneck" to the operation. Even though the belts 61 and 71, which deliver cookies directly into the trays 10 travel at approximately the same speed as the conveyor belt 40, two such conveyors are needed due to the time delay in each of the conveyors 6 and 7 returning from the uppermost position, after loading the uppermost cookie, to the lowermost position for again loading a new tray 10. It is this time delay which results in the need for the two conveyors 6 and 7 rather than just one. It would not be desirable to merely speed up one of the conveyors 6 or 7 to handle a greater load since the speeds of the conveyors belts 61 and 71 are preferably selected at the optimum speed to prevent damage to the cookies during loading of the trays 10 while at the same time loading the cookies as fast as possible. Therefore, the cookies are sequentially loaded in columns in the trays 10 one atop the other, with each of the conveyor belt ends of conveyors 6 and 7 rising by a height equal to a height of a single cookie as each next cookie is loaded.

The movable roller ends 42 are visible in FIG. 2 as are the springs 52 which bias the roller 42 to maintain the belt tension within a predetermined range. The spring-biased roller 609 and 709 are not shown in FIG. 2 to avoid cluttering the Figure.

The pivoting joint 51 is seen in dotted outline in FIG. 2. Also shown in FIG. 2 is the housing (unnumbered) of the conveyor 4 supporting rollers which are fixed, with the housing for the movable portion 5 (the housing being unnumbered for the movable portion 5 as well) being fixed for movement with the pivotable section 5. As seen in FIG. 2, the gaps between adjacent rollers is relatively small, the gap between rollers 54 and 63 being small, and in the dotted outline position of FIG. 1, the distance between rollers 54 and 62 being small. Therefore, a direct result of the pivoting action of the pivotable conveyor portion 5 is that the conveyor 7 must be located slightly to the left of and beneath the conveyor 6 since due to the radial travel of the pivoting portion 5 a greater gap would otherwise result between the rollers 54 and 62 than the gap between the rollers 54 and 63.

The table 85 rotates generally according to the arrow in FIG. 2. The fixed member 961 is shown in FIG. 2 as having a curved shape for causing movement of a projection 89 that results in pivoting of the lower tray support portion 811 of the tray support devices 8. The cross-sectional outline of the strut 962 is visible as a circular outline in FIG. 2, since such a strut would of necessity be cut in the view taken along 2—2 of FIG. 1. It is noted that while the strut 962 and member 961 are not shown directly above the table 86 in FIG. 1, they are indeed present and were merely omitted to avoid overly cluttering the FIG. 1.

FIG. 3 is a perspective view of a single tray 10 used in the preferred embodiment of the present invention. The tray 10 has a left side wall 162, right side wall 163, a top wall 164, and a lower wall 165. Three separate compartments 160 are all formed in the tray 10. A rear surface 163 is seen in FIG. 3, as being the lowermost right-hand edge of the right-most compartment 160 in FIG. 3. A compartment connecting portion 161 is seen in FIG. 3, which limits the entry of the slab-like members 82 between the compartment space and between the rear of compartments 160. This permits support of the trays 10 without providing a hard surface directly in contact with any of the ridge-like ribs formed in the tray surface.

The ridge portions are formed to conveniently provide a locating means for each of the cookies, the distance between adjacent ribs being approximately the thickness of a cookie. However, the ribs also tend to give the tray additional strength laterally and against bending. Nonetheless, the entire tray 10 is formed of very flexible, resilient material which, upon collision with a cookie, would not tend to damage it provided the collision occurred at a sufficiently low speed in the case of a very soft cookie as to avoid damage to the cookie by bending, crumbling, or the like. With hot, soft cookies which can be directly loaded into the trays 10, any bending of the hot, soft cookies will upon cooling, become a permanent shape to the cookie which is generally regarded as unattractive and slightly unappealing. Therefore, the resilient nature of the tray, together with the support arrangement shown in FIG. 1, permits the tray to resiliently collide with all portions of the cookies C which collide with it and are loaded into the trays 10.

Figure 4:
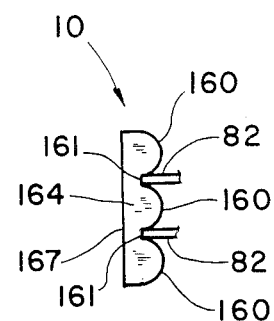
FIG. 4 is a rear elevational view taken from the rear of FIG. 3, and showing a top surface of the tray as it would be supported by arm members in a loading position.

FIG. 4 is a rear elevational view of FIG. 3, showing the top of the tray 164. As seen, the three compartments 160 have a generally circular right-hand outline, with the left-hand most edge of the tray 10 being linear. Two slab-like members 82 are shown in FIG. 4 inserted between the compartments 160.

Figure 5:
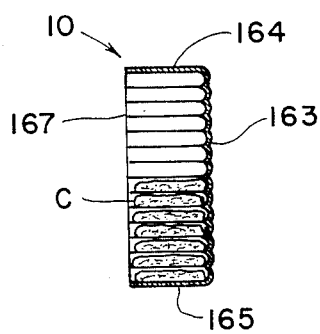
FIG. 5 is a side view partially in section of the tray of FIG. 3 taken along line 14—14 of FIG. 3 and shows cookies which are stacked so as to partially fill a portion of the tray shown.

FIG. 5 is a side view partially in cross-section taken along line 14—14 of FIG. 3. Also shown therein is a stack of cookies C, partially loaded into the tray 10, which cookies C are stacked atop one another in the tray 10. As seen in FIG. 5, the tray 10 has a flexible rear wall 163, and generally flexible top and bottom walls 164 and 165. A leading edge 167 of the tray 10 is visible in FIG. 5.

Figure 6:
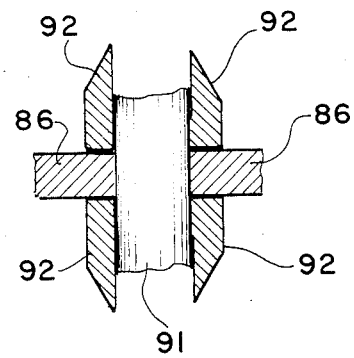
FIG. 6 is a side sectional view showing the frictional rotary drive of the carousel according to the present invention.

FIG. 6 is a side view partially in section of the frictional transmission used to drive the rotary disc table 86. A similar frictional transmission would be used to drive the rotary table 85 as well. As seen, the table 86 is shown as being broken away along its extremities and is seen in sectional view. Also, a covering portion 92 of the portion 9 of FIG. 1 is seen as surrounding a rotating frictional drive member 91. The portion 92 may rotate with the shaft 91 or may rotate relative thereto, and is merely used to keep dirt and dust from the fricitional drive system. The shaft 91 preferably has a frictional contacting engaging relationship with the table 86, which is sufficiently strong to move the table at a reasonably fast speed during operation thereof, and yet having a sufficiently low frictional resistance that relative rotation between the table 86 and the shaft 91 is permitted while the table 86 is held stationary by any relatively low force applied to the table 86. This prevents accidents, destruction of the carousel 20, destruction of the devices 8, or the like due to improper operation when an obstruction is present.

Such an obstruction is the plunger 920 actuated by the control device 921 which indexes the table 86. The indexing is one at bores 99 which are formed into the edge surfaces of the table 86. Each of the bores 99 is located at a point where a tray holding device 8 is properly located with respect to the conveyors 6 or 7. The plunger 920 can if desired be spring-biased against the outer surface of the table 86 so tht it is automatically inderted into the bores 99 upon encountering a bore 99 during rotation of the table 86 relative to the control device 921. During timed operation of the carousel relative to the conveyor belts, retraction of the plunger 920 is accomplished by a suitable electrical or mechanical input to the device 921. For example, if an electrical signal is used to indicate that the conveyor 6 is heading down or the conveyor 7 is heading downward, such indicates that the previous tray is full and that a new tray is needed to be rotated into position. Such a signal can be transmitted electrically, for example, or mechanically through a linkage or cam means associated with the movable conveyors. If an electrical actuator is used, a solenoid device (not shown) could be used to withdraw the plunger 920 back toward the device 921 to the position shown in FIG. 7.

FIG. 8 is a side elevational view of a portion of the table 86 showing the circular outline of the bore 99. Although a circular outline is used, and a bore is discussed, the indexing means could be any type means, not just a bore. Also, the bore need not be circular but can have any cross-sectional shape desired. For example, an indexing means could include magnets fixed to the table 86 in association with a magnetic locking device such as a fixed plunger having a strong magnetic or electromagnetic field for retaining the table in place until withdrawal of the magnet or cessation of the electromagnetic field. Any other types of indexing means can also be used, and such are contemplated as being within the scope of the present invention, since such could be used by anyone of skill in the control apparatus art.

Figure 9:
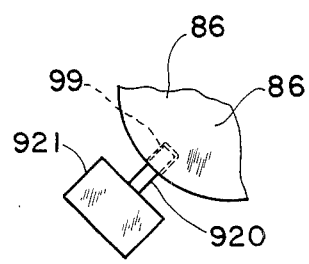
FIG. 9 is a top elevational view, partially broken away, of the indexing means in its indexing position in the bore shown in FIG. 8.

FIG. 9 shows the indexing means of the preferred embodiment, the plunger 920, in indexed insertion into the bore 99. The table 86 is shown as being partially broken away. The actuating device 921 is shown in FIG. 21, with the plunger 920 being in its extended position indexing the table 86 by insertion into the bore 99, thus preventing relative movement between the table 86 and the device 921 which is fixed to a support.

Figure 10:
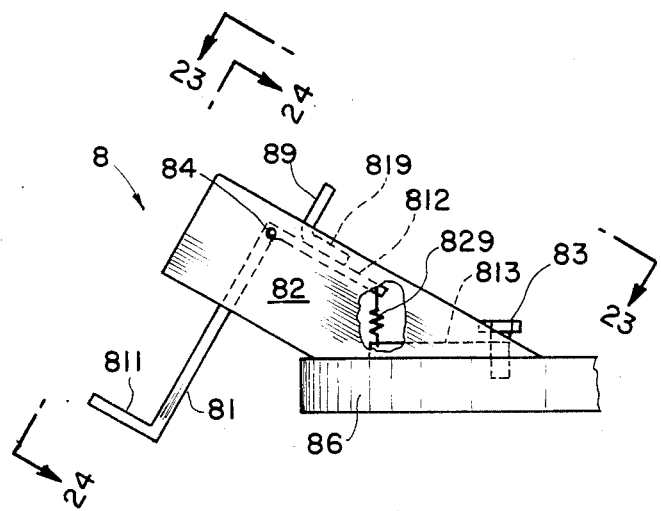
FIG. 10 is a side elevational view of a tray support device according to the present invention.

FIG. 10 is a side elevational view of the tray holding device 8 of the present invention. A slab-like member 82 is seen in its true side elevational view in FIG. 10, and is fixed to the table 86 by a bolt 83. A portion of the front slab-like member 82 is broken away to show a schematic view of a spring 829 which is fixedly connected to the table 86 and at its other end to a portion 812 of the tray holding device 8.

A connecting member 813 connects two of the slab-like members 82 to one another and to the table 86 by use of the bolt 83. Several bolts can be provided, if desired, and the slab-like members can also be welded if desired to the table 86. A member 89 projects above the slab-like members 82 in FIG. 10, the member 89 being fixedly connected to the portion 812 along a length 819 thereof. The member 89 is conveniently a rod-like member which is bent into a right-angle form having a lower portion 819 which is preferably welded or otherwise attached fixedly to the portion 812 of a pivoting portion 81 of the tray support device 8.

The pivoting portion 81 pivots about a pivot member 84 which is supported at its ends by the slab-like members 82. The lowermost end of the pivotable portion 81 is bent at right angles thereto and is adapted for support of a tray thereon. The lowermost portion 811 of the pivotable portion 81 is not necessarily positioned at right angles to the portion 81 but can be at other angles thereto if such is desired. The spring 829 is used to pre-load the pivotable member 81 in a predetermined position, so that upon movement of the member 89 by an unloading member 961 (shown in FIGS. 1 and 2), the spring 829 is deformed and lengthened so as to enable pivoting about the pivot 84 of the pivotable portion 81 so that the tray can slide off the lower portion 811 and down a chute for subsequent handling or processing.

Figure 11:
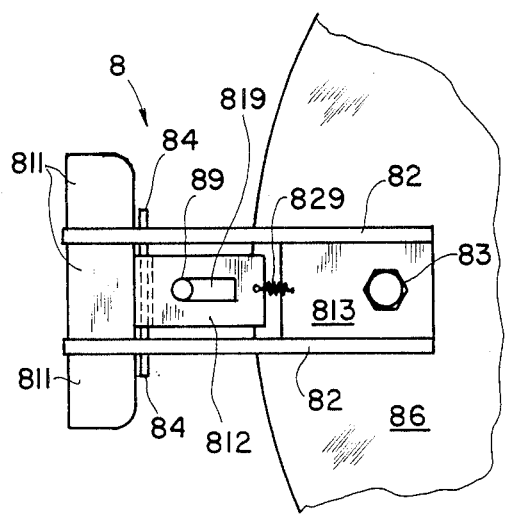
FIG. 11 is a top elevational view of the tray supporting device shown in FIG. 10.

FIG. 11 is a top elevational view of the tray support device taken along line 23—23 of FIG. 10. This shows the true length of the uppermost edges of the slab-like members 82. As seen in FIG. 11, a pair of slab-like members have projecting ends, and are fixedly connected to the table 86 by the bolt 83. The bolt 83 passes through the connecting portion 813, which is preferably welded, bolted, or otherwise fixedly secured to both of the members 82 in the FIG. 11.

The member 89 is seen as centered upon the pivotable portion 812 of the pivotable member 81. As seen in FIG. 11, the lowermost portion 811 is very long and actually extends beyond each of the slab-like members 82 for full support of the trays 10. At the angle of view taken along FIG. 10, the spring member 829 appears schematically in FIG. 11 as connected between the portion 812 and the connecting member 813. The pin 84 is seen as enabling pivoting of the member 81 relative to the slab-like members 82. The portion 812 can be substantially narrower than the space between the slab-like members 82, or it may entirely occupy the space between the slab-like members 82 so long as it does not frictionally interfere therewith to any substantial degree. The pivot member 84 can be a rod inserted through a hole bored into the member 81, or it can be a rod or elongated article having any other cross-sectional shape physically attached beneath or atop the intersection of portions 81 and 812 of the pivotable section.

Figure 12:
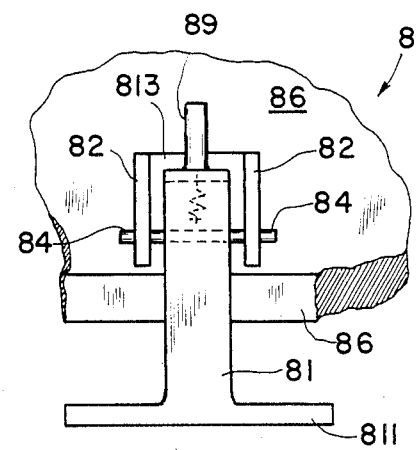
FIG. 12 is a front elevational view of the the tray supporting device shown in FIG. 10.

FIG. 12 is a front elevational view taken along line 24—24 of FIG. 10. The table 86 is shown partially broken away in this view. This view shows the true edge face surface of the lower tray support surface 811. All of the other parts, and their relationships, are as discussed with reference to the above-discussed FIGS. 10 and 11. In FIG. 12, the support surfaces used for directly contacting the trays 10 of the slab-like members 82 are visible fully.

Figure 13:
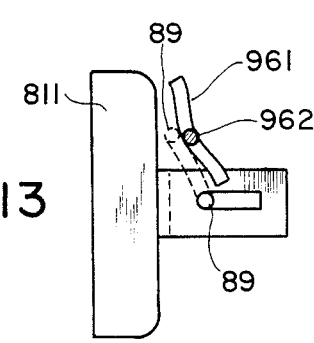
FIG. 13 is a top elevational view, partially in section, showing a tray unloading means including a dotted-line position of the tray unloading means being moved by a fixed member.

FIG. 13 is a top elevational view, partially in section, of the unloading process as shown by the dotted outline. The member 89 is constrained to move forwardly by the member 961 which is fixed by a strut 962 (broken away in sectional view as having a circular outline in FIG. 13). The dotted path of travel is also shown in FIG. 13 of the member 89.

Figure 14:
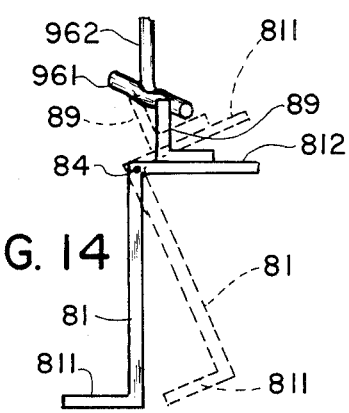
FIG. 14 is a side view showing a first and a second position of a tray support device, the dotted outline position indicating the unloading position.

FIG. 14 shows the result of such movement of the member 89, that is the tilting of the pivotable portion 81 from its solid-outlined position to the dotted-outline position shown in FIG. 14. The pivotable movement results in the dotted outline position of the member 89, and the upward movement of the portion 812 as seen in dotted outline in FIG. 14. The member 961 has an unusal arcuate shape to provide for smooth transition and low frictional forces between the member 89 and the member 961. Also as seen in FIG. 14, the member 961 can be lower at the right-hand portion and higher at the left-hand portion so that a very smooth transition can be made to occur without interference between the parts to any undue extent. This permits release of the pivotable section 81 after the tray 10 has been unloaded therefrom.

While a chute has been discussed as the unloading means, any other type of unloading means could be used as well and such is contemplated as being within the scope of the present invention. For example, a robot mechanism can physically lift out the trays 10 from the devices 8, or such can be done manually as well. All other types of loading and unloading devices for loading trays onto supports for supporting the tray without rigidly supporting the resilient cookie-receiving portions are contemplated as being within the scope of the present invention. Such devices for handling or conveying are well known to anyone having skill in the conveying or material handling arts, and therefore such other devices are properly within the scope of the present invention.

What is claimed is:

1. An apparatus for handling articles, comprising:
a rotatable table having holders for a plurality of trays, wherein each of said trays has at least two compartments separated by a connecting portion, each holder comprising means for supporting each of said trays, said means for supporting trays being adapted to be in supporting contact with each of said trays along said connecting portion, said means for supporting trays comprising a fixed section and a pivotable section, wherein each of said trays is supported along a bottom edge thereof by said pivotable portion, and is supported along said connecting portion by projecting members of said fixed section.

2. An apparatus for handling articles as claimed in claim 1, further comprising:
a means for moving said means for supporting trays to an article loading position; said means for moving said means for supporting trays also moving said means for supporting trays from a loading position to an unloading position.

3. An apparatus for handling articles as claimed in claim 2, further comprising:
said means for moving said means for supporting trays also moving unloaded ones of said means for supporting trays to an empty tray loading position.

4. An apparatus for handling articles as claimed in claim 3, further comprising:
a carousel for rotating said means for supporting trays; said carousel sequentially rotating said means for supporting trays into an article loading position, into a filled tray unloading position, into a position for placing empty trays on said means for supporting trays, and back into said article loading position;
a means for indexing rotation of said carousel, to stop said carousel at said article loading position and at said filled tray unloading position.

5. An apparatus for handling articles as claimed in claim 4, further comprising:
said means for indexing including a stop member which is selectively retractable from an indexing position in a stop member receiving portion of said carousel.

6. An apparatus for handling articles, comprising:
(a) a first rotatable table comprising a pair of slab-like members having projecting ends adapted to be received by compartment connecting portions of trays, a connecting member fixedly connecting the pair of slab-like members to each other and to the first rotatable table;
(b) a pivotable tray support means attached to said table comprising a pivoting member located between the pair of slab-like members, said pivoting member being pivotable about a pivot supported about its ends by said slab-like members, said pivoting member having its lower most portion bent to support trays.

7. The apparatus of claim 6 where the pivotable tray support means further comprises a rod-like member projecting above the slab-like members being fixedly attached to the pivoting member, whereby the pivoting member can be pivoted by a downwardly projecting unloading member.

8. The apparatus of claim 7 where the pivotable tray support means further comprises a spring connecting the pivoting member to the connecting member for pretensioning the pivoting member.

9. An apparatus for handling articles, comprising:
(a) a first rotatable table having a pair of slab-like members with projecting ends for insertion into rear portions of trays, a connecting member fixedly connecting the pair of slab-like members to each other and to said first rotatable table;
(b) a pivotable tray support means attached to said table, said pivotable tray support means comprising a pivoting member located between the pair of slab-like members, said pivoting member being pivotable about a pivot supported about its ends by said slab-like members, said pivoting member having its lowermost portion bent to support trays, a rod-like member projecting above the slab-like members being fixedly attached to the pivoting member, whereby the pivoting member can be pivoted by a downwardly projecting unloading member, a spring connecting the pivoting member to the connecting member for pretensioning the pivoting member.

10. The apparatus of claim 9 further comprising a spindle for rotating tables, wherein the first rotatable table is adapted to receive the spindle in a frictional contacting engaging relationship.

11. The apparatus of claim 10 further comprising a support member for rotatably receiving one end of said spindle and a base to provide rotary motive power to the spindle.

12. The apparatus of claim 11 further comprising indexing means to intermittently permit rotation of the first rotatable table.

13. The apparatus of claim 12 where the indexing means comprises bores located on said first rotatable table and a plunger mounted on a support for cooperating with the bores.

14. The apparatus of claim 13 further comprising a second rotatable disc mounted on said spindle, said second rotatable disc having pivotable tray support means fixedly attached to said table, said pivotable tray support means having a slab-like member for entering rear portions of trays and a lower tray support surface.

15. The apparatus of claim 14 where the spindle further comprises an inner shaft for rotating the first and second tables independently of one another.

16. An apparatus for handling articles, comprising:
 (a) a rotatable spindle;
 (b) a support for rotatively receiving one end of the spindle;
 (c) a base connected to the spindle for rotating said spindle;
 (d) a first rotatable taable in frictional engagement with said spindle having a slab-like member attached thereto for insertion into compartment connecting portions of trays;
 (e) a pivotal tray support means mounted on said first rotatable table, said pivotal tray support means having a lowermost portion for supporting the trays;
 (f) unloading means for pivoting said tray support means to unload trays supported by said trays support means.

17. The apparatus of claim 15 further comprising a second rotatable table in frictional engagement with said spindle, said second rotatable table having a pivotal tray support means fixedly mounted on said second rotatable table, said pivotal tray support means having projecting ends for entry in compartment connecting portions of trays and a lowermost portion for supporting the trays.

18. The apparatus of claim 16 where the spindle further comprises an inner shaft for rotating the first and second tables independently of one another.

* * * * *